Figure 2:
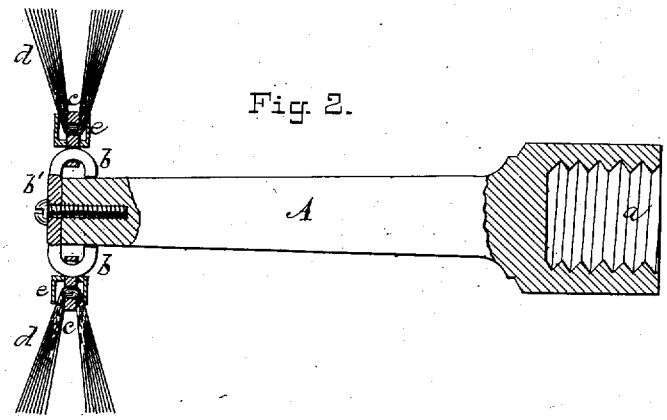

R. DIMES.

Assignor to Tiffany & Co.

PROCESS AND APPARATUS FOR STIPPLING METALLIC SURFACES.

No. 7,656. Reissued May 1, 1877.

ATTEST:
Robert Moore
James A. Hunter

INVENTOR:
Richard Dimes

UNITED STATES PATENT OFFICE.

RICHARD DIMES, OF NEW YORK, N. Y., ASSIGNOR TO TIFFANY & CO., OF SAME PLACE.

IMPROVEMENT IN PROCESSES AND APPARATUS FOR STIPPLING METALLIC SURFACES.

Specification forming part of Letters Patent No. 128,290, dated June 25, 1872; reissue No. 5,378, dated April 29, 1873; reissue No. 7,656, dated May 1, 1877; application filed April 17, 1877.

DIVISION A.

*To all whom it may concern:*

Be it known that I, RICHARD DIMES, of the city, county, and State of New York, have invented certain new and useful Improvements in Stippling and Dressing the Surfaces of Metals; and I do hereby declare that the following is a full, clear, and exact description of the same.

This invention relates to stippling and dressing surfaces of silver-ware, and other goods composed of metal or containing metallic surfaces, by means of stippling-points made of metal or other suitable material, or fine wires so constructed and operated that their points will impinge against and rebound from the metallic surface with which they are brought in contact. This operation will leave the surface so stippled in a finely-indented condition, giving to the naked eye a satin or pearl-finished appearance.

In the drawing is shown one way in which these stippling-wires may be constructed and operated.

Figure 1:
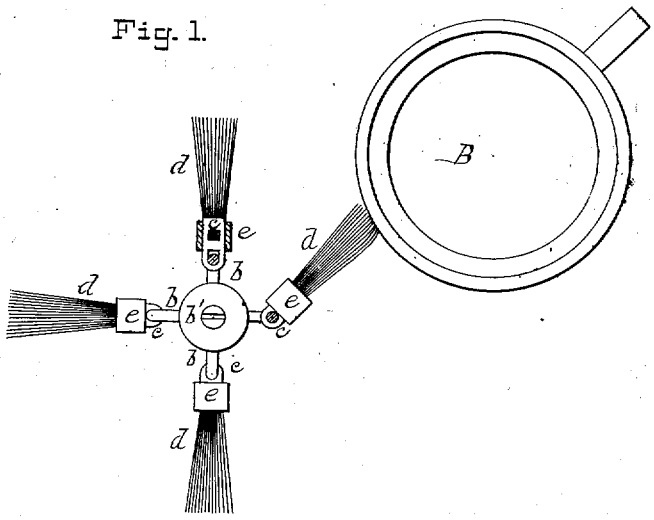

Figure 1 is a front view of a stippling-device, and Fig. 2 is a side sectional view of the same.

A is a spindle or chuck, provided at one end with a screw-nut, *a*, by which it may be screwed up on the mandrel of a lathe. The opposite end of the chuck is provided with a chuck-head, *b'*, to which is attached a number of loops, *b b*, &c., which receive links *c c*, &c., each of which latter has two perforations, through one of which one of the loops *b* passes. Through the other perforation the wires containing the stippling-points *d* pass, and in which they are secured by the sliding cap *e*, as shown.

The stippling-points are composed of the ends of fine metal wire. Each link is intended to carry a number of the stippling-wires, which may be of greater or less size, according to the nature of the stippling action that may be required.

When the chuck A is made to revolve with sufficient rapidity the bunches of jointed stippling wires will swing or stand out radially from the chuck; and if the surface of a goblet, B, or other article to be stippled, satin or pearl finished, be held in such a position that the flying stippling-wires will strike it, the points of the wires only will operate on the surface, and will produce indentations on such surface, the links enabling each bunch of wires to yield sufficiently to pass the goblet or other article immediately after the points have struck it. The surface of the article thus presented to the action of the stippling-points will, in this manner, be quickly covered with minute indentations, whereby a stippled, satin or pearl finished appearance of great beauty is obtained at a small cost.

If it is desired to keep portions of the surface of the article smooth, to form a design, a shield of metal, or other material, is placed over the part that is to be kept smooth during the operation of the stippling device. Various forms or kinds of stippling may be produced by increasing or diminishing the number or sizes of the stippling-wires.

I claim—

1. One or more bunches of stippling-wires, loosely connected to a revolving chuck or mandrel, substantially as described.

2. The combination of one or more bunches of stippling-wires with links loosely connecting said bunches to loops on the chuck or mandrel, substantially as described.

3. The combination of the link *c*, cap *e*, and stippling-wires *d*, substantially as described.

4. The chuck-head *b'*, carrying the loops *b*, substantially as described.

RICHARD DIMES.

Witnesses:
ROBERT MOORE,
JAMES H. HUNTER.